(12) United States Patent
Yip et al.

(10) Patent No.: US 7,630,149 B2
(45) Date of Patent: Dec. 8, 2009

(54) CONTAINER INDICIA MAGNIFIER

(75) Inventors: Gin Fai Yip, North Point (HK); Bryan Yip, Kowloon (HK); Richard Cameron, Syosset, NY (US)

(73) Assignees: Carson Optical, Inc., Hauppauge, NY (US); Leading Extreme Optimist Industries, Ltd., Chai Wan (HK)

( * ) Notice: Subject to any disclaimer, the term of this patent is extended or adjusted under 35 U.S.C. 154(b) by 0 days.

(21) Appl. No.: 11/649,583

(22) Filed: Jan. 4, 2007

(65) Prior Publication Data

US 2008/0165417 A1   Jul. 10, 2008

(51) Int. Cl.
   *G02B 27/02* (2006.01)
(52) U.S. Cl. .................. 359/802; 359/817; 359/440
(58) Field of Classification Search ........ 359/817, 359/819, 440–442, 802; 73/327; 374/193; 294/9–17, 19.2, 27.1–34, 137
   See application file for complete search history.

(56) References Cited

U.S. PATENT DOCUMENTS

| | | | | | |
|---|---|---|---|---|---|
| 2,564,956 | A | * | 8/1951 | Bumgardner, Sr. | 294/31.1 |
| 2,641,965 | A | * | 6/1953 | Valenza | 359/802 |
| 2,746,346 | A | * | 5/1956 | Gaire | 359/442 |
| 3,955,884 | A | * | 5/1976 | Del Pesco, Sr. | 359/804 |
| 4,316,330 | A | * | 2/1982 | Hayes | 33/488 |
| 4,349,246 | A | * | 9/1982 | Binner | 359/880 |
| 5,054,226 | A | * | 10/1991 | Hart | 43/4 |
| 5,207,746 | A | * | 5/1993 | Jones | 283/81 |
| 5,309,279 | A | * | 5/1994 | Halstead | 359/442 |
| 5,494,060 | A | * | 2/1996 | Potut | 132/277 |
| 5,588,689 | A | * | 12/1996 | Ochs | 294/118 |
| 5,847,883 | A | * | 12/1998 | Rispoli, Sr. | 359/802 |
| 5,991,150 | A | * | 11/1999 | Chiu et al. | 361/681 |
| 6,081,392 | A | * | 6/2000 | Pensmith | 359/802 |
| 6,356,400 | B1 | * | 3/2002 | Goff et al. | 359/802 |
| 6,594,928 | B1 | * | 7/2003 | Clawson et al. | 40/310 |
| 6,621,629 | B2 | | 9/2003 | Blumenthal et al. | |

OTHER PUBLICATIONS

Pill Bottle Magnifier, IKitchen.com at http://ikitchenhome.com/079-710009.html last accessed Jul. 9, 2009.*

* cited by examiner

*Primary Examiner*—Stephone B Allen
*Assistant Examiner*—Jennifer L. Doak
(74) *Attorney, Agent, or Firm*—Carmody & Torrance LLP

(57) ABSTRACT

A magnifying assembly for use in enlarging information disposed on a container. In a preferred embodiment, the magnifying assembly comprises a container holder assembly for holding the container; and a magnifying lens coupled to the container holder assembly, wherein the magnifying lens is movable towards and away from the container while the container remains held by the container holder assembly; whereby information disposed on the container appears enlarged when viewed through the magnifying lens.

26 Claims, 15 Drawing Sheets

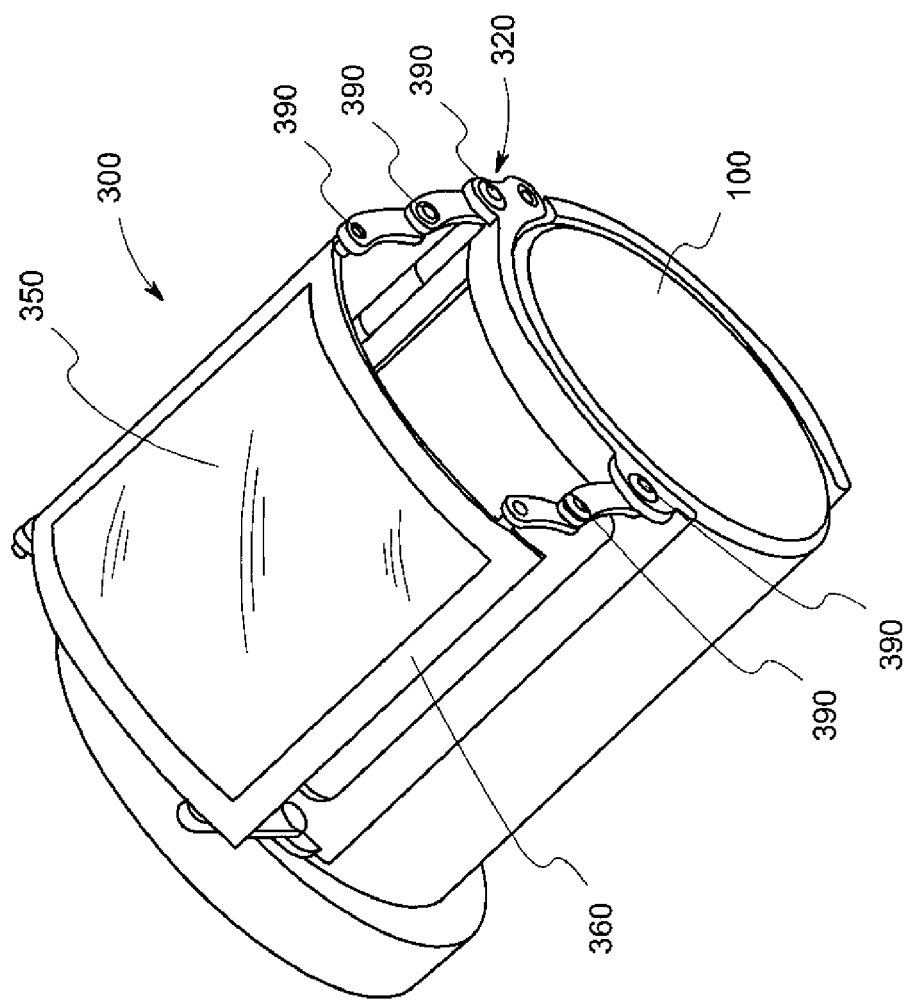

CONTAINER INDICIA MAGNIFIER

BACKGROUND OF THE INVENTION

The present invention relates generally to containers and the reading of the labels thereon and in particular, to a magnifier for reading labels for containers, such as, but not limited to, containers used for prescription medications.

The prior art has recognized the need and/or desire of magnifying the labels on containers, such as those containing prescription medications. At least one patent, U.S. Pat. No. 6,621,629, has attempted to address the problem by providing a flexible wrap-like device that allows a portion of a container to be wrapped therein along with a magnifying lens that is held against the wrapped container.

However, it is still believed that there are deficiencies in the prior art that would be desirable to overcome.

As but one deficiency that is believed to exist across the prior art is the inability to provide a container magnifier, such as for such containers containing prescription medications, that permits the magnifying lens to be moved towards and away from the label while the container remains held by the assembly. That is, it is known that it is desirable to permit for the movement of the magnifying lens towards and away from the label being read so that the magnification and/or focal point can be varied. An assembly in which the magnification lens remains held against the label is believed to suffer from the aforementioned deficiency.

As but another deficiency in the prior art is that the prior art does not provide a container magnifying assembly that allows for easy storage in a medicine chest, cabinet or the like. Specifically, an assembly that can collapse and be expanded as the case may be, which provides for the enlargement of the indicia on the container during use as well as collapsibility for easy storage, is believed to be absent in the art.

In view of the belief that label information is provided in varying sizes and in further view of the belief that the containers themselves come in varying sizes and shapes (e.g. rectangular), it would be desirable to provide a magnifying assembly that is sufficiently versatile to be used with a wide range of containers (e.g. of different sizes and/or shapes) while at the same time permitting the magnifying lens to be adjustable as it relates to its distance from the label or writing on the container itself so as to provide the information to be enlarged to the desired size and focus.

Moreover, while the present invention is primarily designed to be used with containers for prescription medicines wherein the "information" may be for example and not limitation, the name of the medication, the required dosage, identification names and phone numbers of the prescribing physician and pharmacy, prescription identification number and other information such as precautions and manner of use, it should be appreciated that the present invention is not limited thereby. That is, users may also appreciate the present invention as being applicable to reading information on other containers, such as for nonprescription vitamins, just to name but one example.

Accordingly, further advances in the art are believed to be desirable. In particular, a magnifying assembly that overcomes the aforementioned deficiencies and achieves the aforementioned and below mentioned objectives is desirable, and believed to be provided by the present invention.

SUMMARY AND OBJECTIVES OF THE PRESENT INVENTION

It is thus an objective of the present invention to overcome the perceived deficiencies in the prior art.

For example, it is an objective of the present invention to provide an improved magnifier for container labels, such as those used on prescription medication containers.

It is another objective of the present invention to provide an improved magnifier for container labels for other items, such as, but not limited to, cosmetics, nonprescription vitamins other containers that may have relatively fine print thereon, e.g. on their labels.

Yet a further objective of the present invention is to provide an improved magnifier that is relatively inexpensive to manufacture and that can be easy to use by persons having limited eyesight and/or vision.

Still another object of the present invention to provide an improved magnifier that can be easily used by persons that would otherwise not want, or find it less than convenient, to use a conventional magnifying lens (e.g. with a handle).

Yet another objective of the present invention is to provide an improved magnifier that can be utilized by persons simply seeking to enlarge the print on such containers or labels.

Yet another objective of the present invention is to provide a magnifying assembly of the type disclosed herein that can be used with containers of various sizes (e.g. large and small in diameter) and shapes (e.g. rectangular).

Further objects and advantages of this invention will become more apparent from a consideration of the drawings and ensuing description.

The invention accordingly comprises the features of construction, combination of elements, arrangement of parts and sequence of steps which will be exemplified in the construction, illustration and description hereinafter set forth, and the scope of the invention will be indicated in the claims.

To overcome the perceived deficiencies in the prior art and to achieve the objects and advantages set forth above and below, the present invention is, generally speaking, directed to a magnifying assembly for use in enlarging information disposed on a container. In a preferred embodiment, the magnifying assembly comprises a container holder assembly for holding the container; and a magnifying lens coupled to the container holder assembly, wherein the magnifying lens is movable towards and away from the container while the container remains held by the container holder assembly; whereby information disposed on the container appears enlarged when viewed through the magnifying lens.

In another preferred embodiment, the magnifying assembly for use in enlarging information disposed on a container may comprise a first container holding arm and a second container holding arm spaced apart from the first container holding arm, wherein the first and second container holding arms are moveable towards and away from each other; and a magnifying lens coupled to at least one of the first and second container holding arms; whereby a container is releasably holdable between the first and second container holding arms and information disposed on the container appears enlarged when viewed through the magnifying lens.

BRIEF DESCRIPTION OF THE DRAWINGS

The above set forth and other features of the invention are made more apparent in the ensuing Description of the Preferred Embodiments when read in conjunction with the attached Drawings, wherein.

Identical reference numerals in the figures are intended to indicate like parts, although not every feature in every figure may be called out with a reference numeral.

DETAILED DESCRIPTION OF THE PREFERRED EMBODIMENTS

Figure 4:
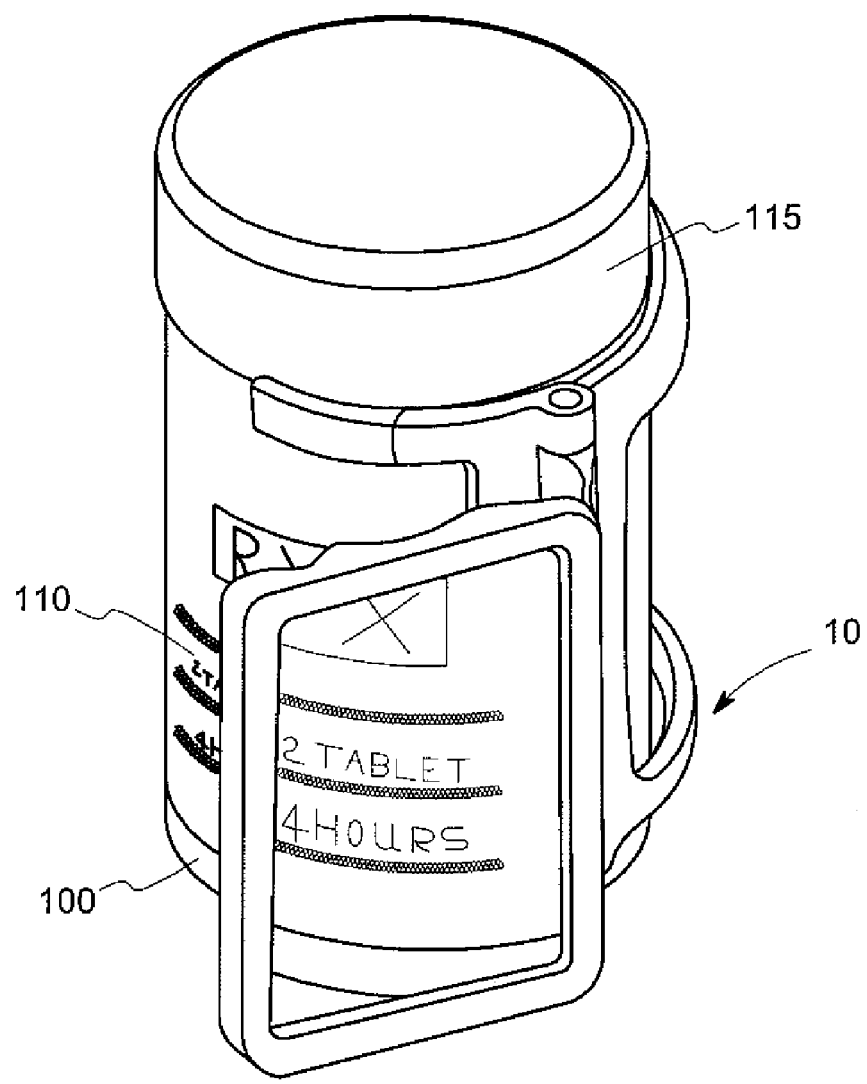
FIG. 4 is a perspective view of the magnifying assembly of FIG. 1 with a conventional container for prescription medications being held thereby with information on the label thereof also being enlarged by the magnification of the magnifying lens.

Reference is first made to FIG. 4 for an overview of the present invention, which illustrates a magnifying assembly, generally indicated at 10, for use in enlarging information disposed on a container, such as the one generally indicated at 100.

For example, container 100 comprises a label 110 on which information is provided. The information may be for example and not limitation, the name of the medication, the required dosage, identification names and phone numbers of the prescribing physician and pharmacy, prescription identification number and other information such as precautions and manner of use.

In the most typical situation, container 100 will have a cylindrical shape, although the present invention is not limited thereby as it should be appreciated that other container shapes, such as rectangular just to name one example, may be accommodated by and used with the present invention.

Conventionally, container 100 will be fabricated in accordance with conventional fabrication techniques such as those employed to fabricate prescription medication containers or the like. Again however, it should be understood that the present invention is usable on virtually any shaped or sized container having printed material thereon. A cap, such as "child-proof" cap 115, may be provided thereon.

Now, in connection with the rest of the figures as well and in accordance with the present invention, magnifying assembly 10 comprises a container holder assembly, generally indicated at 20, for preferably releasably holding container 100, and a magnifying lens 50 coupled to container holder assembly 20. In accordance with a preferred embodiment, magnifying lens 50 is movable towards and away from container 100 while container holder assembly 20 holds container 100 (i.e. while the container remains held thereby). In this way, information disposed on container 100 (e.g. on label 110 or on the container itself, for example) appears enlarged when viewed through magnifying lens 50.

Preferably an elongated assembly pin 15 is provided, to which container holder assembly 20 and magnifying lens 50 are coupled.

In a preferred embodiment, container holder assembly 20 comprises a first container holding arm 25 and a second container holding arm 30 spaced apart from first container holding arm 25. As can be seen in the Figs., both the first and second container holding arms 25, 30 are coupled to assembly pin 15. In a particularly advantageous embodiment, container holder assembly 20 comprises a two additional container holding arms, indicated by reference numerals 26, 31 for providing additional support of and holding pressure against container 100. A connecting arm 27 between arms 25 and 26 may be provided to add additional integrity to the container holding arm assembly.

As illustrated in the Figs., second container holding arm 30 is rotateable about pin 15 relative to first container holding arm 25 such that second container holding arm 30 is moveable towards and away from first container holding arm 25. In this way, container 100 is holdable between the first and second container holding arms, an example of which is illustrated in FIG. 4.

In a specific embodiment, second container holding arm 30 is biased towards first container holding arm 25. In a preferred embodiment thereof, the biasing is spring biased and is provided by the use of a spring 35. Such spring biasing provides additional assurances that container 100 will remain held between at least first and second container holding arms 25 and 30 and will not undesirably, inadvertently or prematurely be released from therebetween. Obviously, usage of the foregoing language is intended to appreciate that holding arm 25 is also being biased towards (and/or moving towards) holding arm 30.

Magnifying assembly 10 also preferably comprises at least one magnifying lens support arm 54. Support arm 54 preferably has a first end 55 rotateably coupled to container holder assembly 20 and a second end 56 for supporting magnifying lens 50. In particular, first end 55 may be rotateable about pin 15 as illustrated. In this way, the rotation of magnifying lens support arm 54 moves magnifying lens 50 towards and away from container 100. In a particular embodiment, a second magnifying lens support arm 57 is provided. Support arm 57 also preferably has a first end 58 rotateably coupled to container holder assembly 20 (i.e. and more particularly, to pin 15) and a second end 59 for supporting magnifying lens 50. In a particular shape, support arms 54, 57 take the shape of a frame, generally indicated at 60, wherein magnifying lens 50 is coupled to frame 60 by means such as, but not limited to, adhesive such as glue or the or like, friction fitting, snap fitting or mechanical coupling such as screws, flanges or the like. As can now be seen, second container support arm 30 is positioned intermediate frame 60 (e.g. magnifying lens support arms 54, 57) and first container support arm 25 such that rotation of magnifying lens 50 (e.g. support arms 54, 57) towards and away from container 100 does not interfere with the holding of container 100 between the first and second container holding arms 25, 30 (and arms 26, 31 if so provided).

In a preferred embodiment, first and second container holding arms 25, 30 (and arms 26, 31 if so provided) are spring biased towards each other. Such spring biasing assists to maintain the holding of container 100 therebetween. With container 100 being held thereby, a user need only manually push or pull (as the case may be) frame 60 (e.g. magnifying lens support arm 54 (and arm 57 if so provided)) towards and away from, respectively, container 100. In a preferred way, such rotation of frame 60 can occur while container 100 remains held between the two or more container holding arms by the biasing of second container holding arm 30 towards first container holding arm 25. To be sure, in no way is the present invention limited to the rotation of frame 60 (e.g. the one or more magnifying lens support arms 54, 57) while container 100 remains held between the first and second container holding arms. For example, surely the rotation of frame 60 (e.g. the one or more magnifying lens support arms 54, 57) can take place prior to container 100 being positioned between the two or more container holding arms.

That is, the foregoing is only meant to convey the patentable distinction of the present invention from a mere conventional magnifying lens (i.e. with handle) which too can be moved away from or towards the container. However, none of the known prior art assemblies provide for the adjustment capability disclosed herein (i.e. while the container is being held between arms 25, 30).

In a preferred construction, the magnifying lens support arm(s) and the container holding arms are all formed of plastic. Assembly pin 15 is preferably made of metal, as is spring 35. A (e.g. plastic) sleeve 40 may also be provided about which spring 35 is coupled.

Figure 5A:
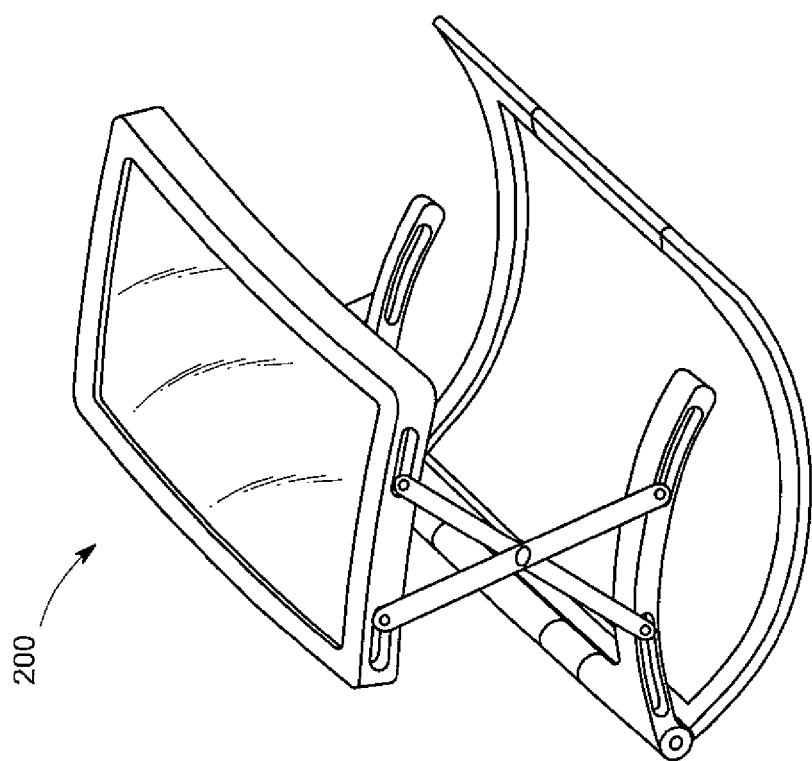
FIGS. 5 and 5A are perspective views of a magnifying assembly constructed in accordance with an alternative embodiment of the present invention.
Figure 5:
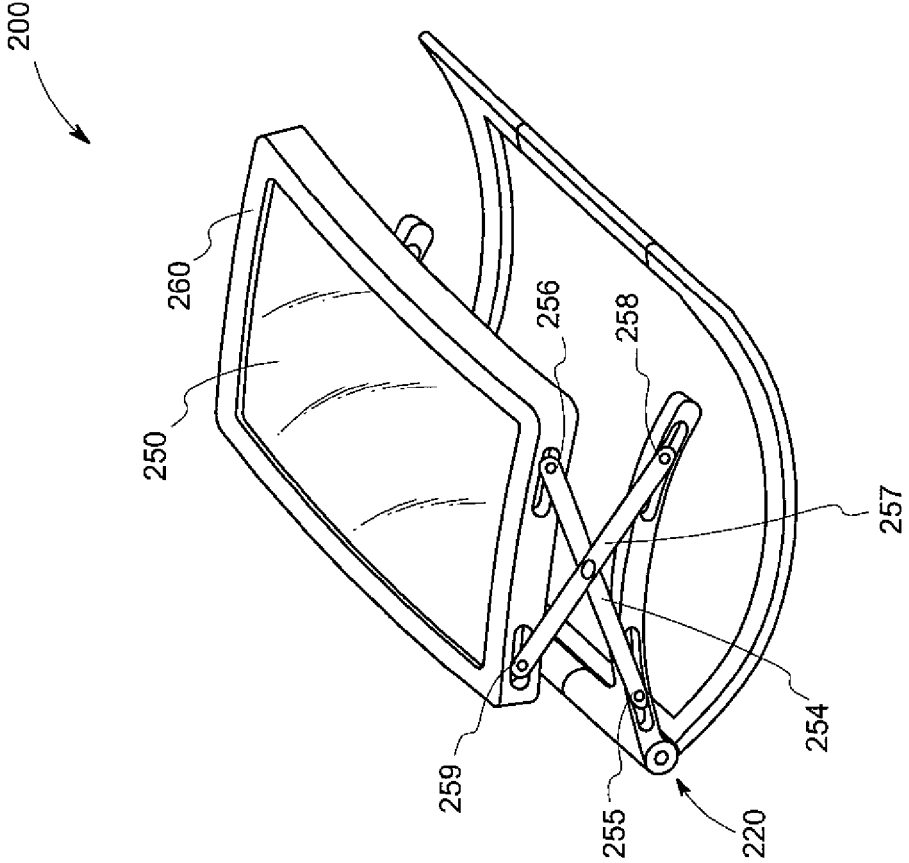

Reference is now made to FIGS. 5 and 5A which show an alternative embodiment of a magnifying assembly, generally indicated at 200, constructed in accordance with the present invention for use in enlarging information disposed on container 100.

Magnifying assembly 200 comprises a container holder assembly, generally indicated at 220, for preferably releasably holding container 100, and a magnifying lens 250 coupled to container holder assembly 220. In accordance with a preferred embodiment, magnifying lens 250 is movable towards and away from container 100 while container holder assembly 220 holds container 100. In this way, information disposed on container 100 (e.g. on label 110 or on the container itself, for example) appears enlarged when viewed through magnifying lens 250.

The container holding assembly 220 may be constructed similarly to container holding assembly 20.

Thus, the significant difference between this embodiment and that disclosed above is in the manner in which the magnifying lens 250 is coupled to container holding assembly 220. In this embodiment, magnifying assembly 200 comprises at least a first magnifying lens support arm 254 having a first end 255 movable relative to container holder assembly 220 and a second end 256 coupled to magnifying lens 250. In this way, the moving of the at least first magnifying lens support arm 254 moves magnifying lens 250 towards and away from the container. In the preferred construction of this alternative embodiment, assembly 200 comprises a magnifying lens support assembly 260 for supporting the magnifying lens 250. Moreover, in the preferred construction, the magnifying lens support assembly comprises four magnifying lens support arms, such as arms 254 and 257, and two arms constructed identically to arms 254 and 257 but positioned on the backside of the assembly and therefore out of view in FIGS. 5 and 5A, each of which have a first end (e.g. 255, 258) slidably coupled to the container support assembly (i.e. container holding arm 230 (similar to arm 30)) and a second end (e.g. 256, 259) coupled to magnifying lens support 260. In this embodiment, each of the respective second ends of all four (4) magnifying lens support arms are slidably coupled to magnifying lens support 260. In this way, the sliding of the first ends of each of the four (4) magnifying lens support arms relative to the container holding assembly and the sliding of each of the second ends of each of the four (4) magnifying lens support arms relative to the magnifying lens support, respectively, moves the magnifying lens towards and away from the container, as shown for example in FIG. 5A.

Reference is now made to FIGS. 6, 6A, 6B and 6C which show yet another alternative embodiment of a magnifying assembly, generally indicated at 300, constructed in accordance with the present invention for use in enlarging information disposed on container 100.

Magnifying assembly 300 comprises a container holder assembly, generally indicated at 320, for preferably releasably holding container 100, and a magnifying lens 350 coupled to container holder assembly 320. In accordance with a preferred embodiment, magnifying lens 350 is movable towards and away from container 100 while container holder assembly 320 holds container 100. Thus, information disposed on container 100 likewise can appear enlarged when viewed through magnifying lens 350.

Container holding assembly 320 may be constructed similarly to container holding assembly 20. Thus, the significant difference between this alternative embodiment and the aforementioned embodiments is also in the manner in which the magnifying lens 350 is coupled to container holding assembly 320.

In this embodiment, magnifying assembly 300 preferably comprises a support assembly comprising four magnifying lens support arms 354, 364, 374, 384 each having a respective first end 355, 365, 375, 385 rotateably coupled to container holder assembly 320 and a respective second end 356, 366, 376, 386. The support assembly comprises a further four (4) magnifying lens support arms 357, 367, 377, 387, wherein:

a first end 358 of arm 357 is rotateably coupled to second end 356 of first magnifying lens support arm 354 and a second end 359 is rotateably coupled to magnifying lens 350;

a first end 368 of arm 367 is rotateably coupled to second end 366 of first magnifying lens support arm 364 and a second end 369 is rotateably coupled to magnifying lens 350;

a first end 378 of arm 377 is rotateably coupled to second end 376 of first magnifying lens support arm 374 and a second end 379 is rotateably coupled to magnifying lens 350; and a first end 388 of arm 387 is rotateably coupled to second end 386 of first magnifying lens support arm 384 and a second end 389 is rotateably coupled to magnifying lens 350.

Figure 6:
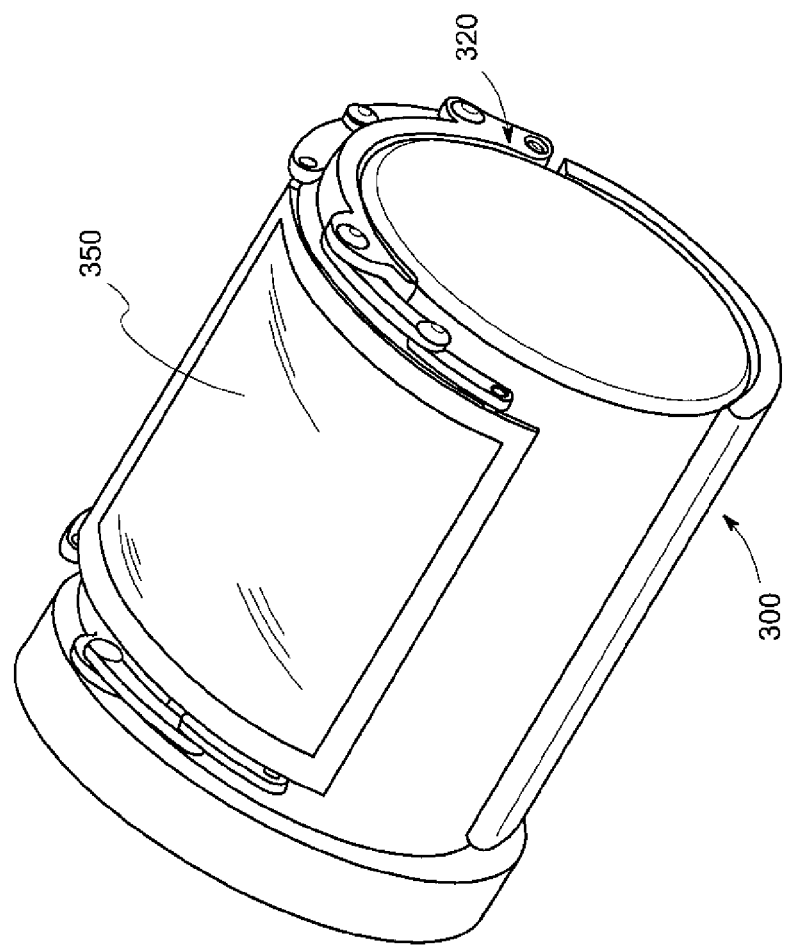
FIGS. 6, 6A and 6B are perspective views of a magnifying assembly constructed in accordance with still another embodiment of the present invention, with FIG. 6C showing this alternative embodiment in an exploded view.
Figure 6B:
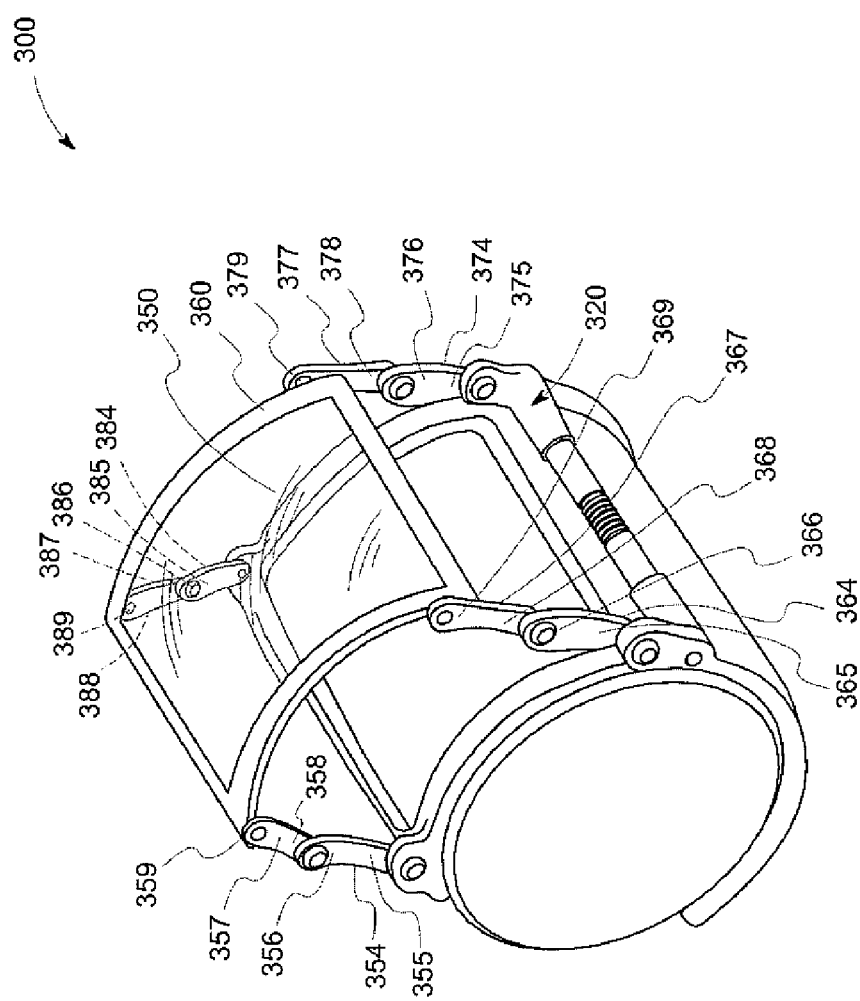
Figure 6C:
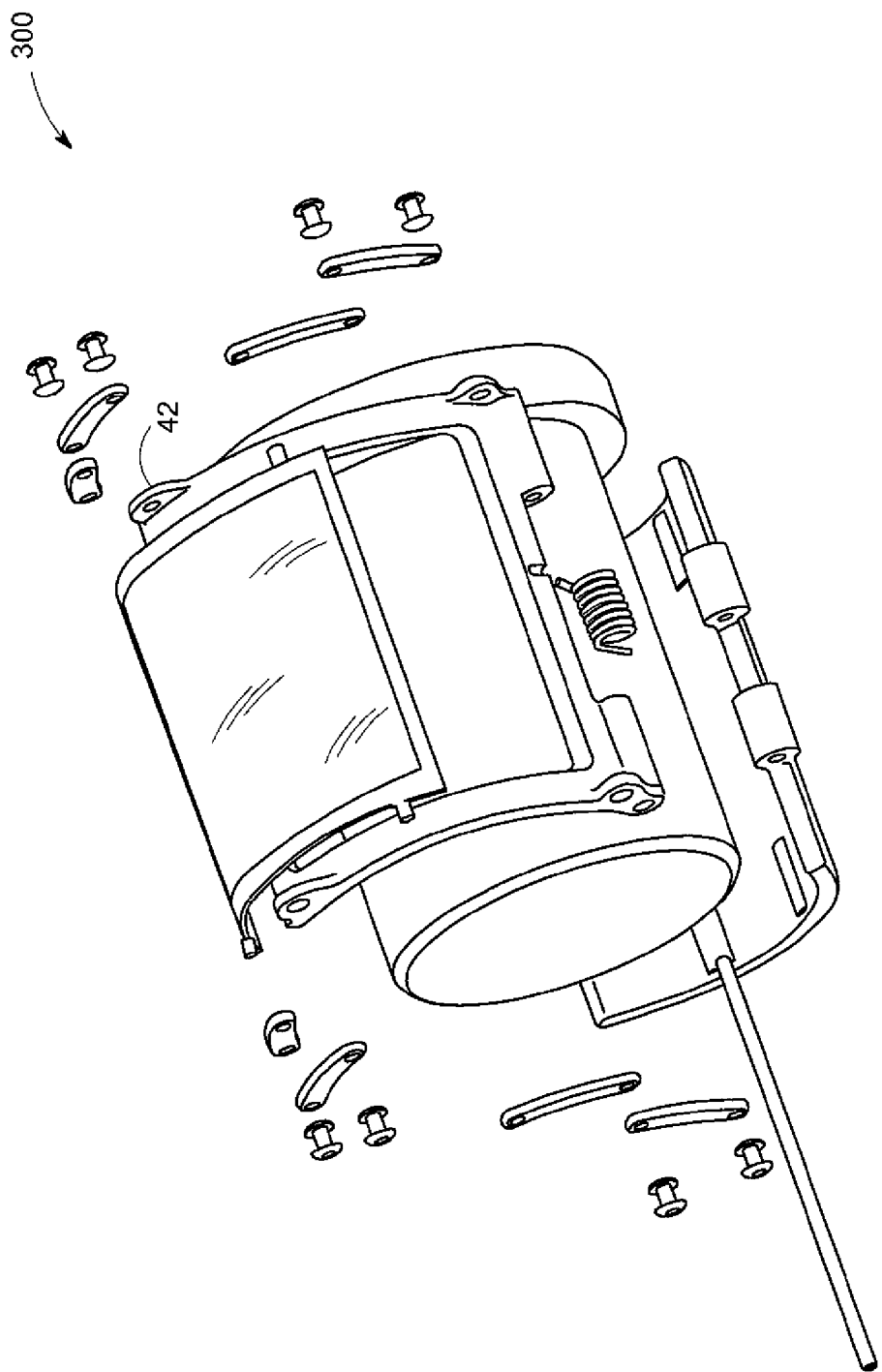

Pins, screws, rivets or the like (e.g. reference numbers 390) may provide the coupling (e.g. couplers) of the arms to each other and/or to the container holding assembly and/or the magnifying lens. In this way, the rotation of the magnifying lens support arms relative to the container holding assembly and/or the magnifying lens moves the magnifying lens towards and away from the container, as illustrated in the figures. Also, it should be clear that a magnifying supporter 360 may be provided to support magnifying lens 350 and thus be coupled to the arms themselves. FIG. 6C illustrates an exploded view of magnifying assembly 300.

Figure 7:
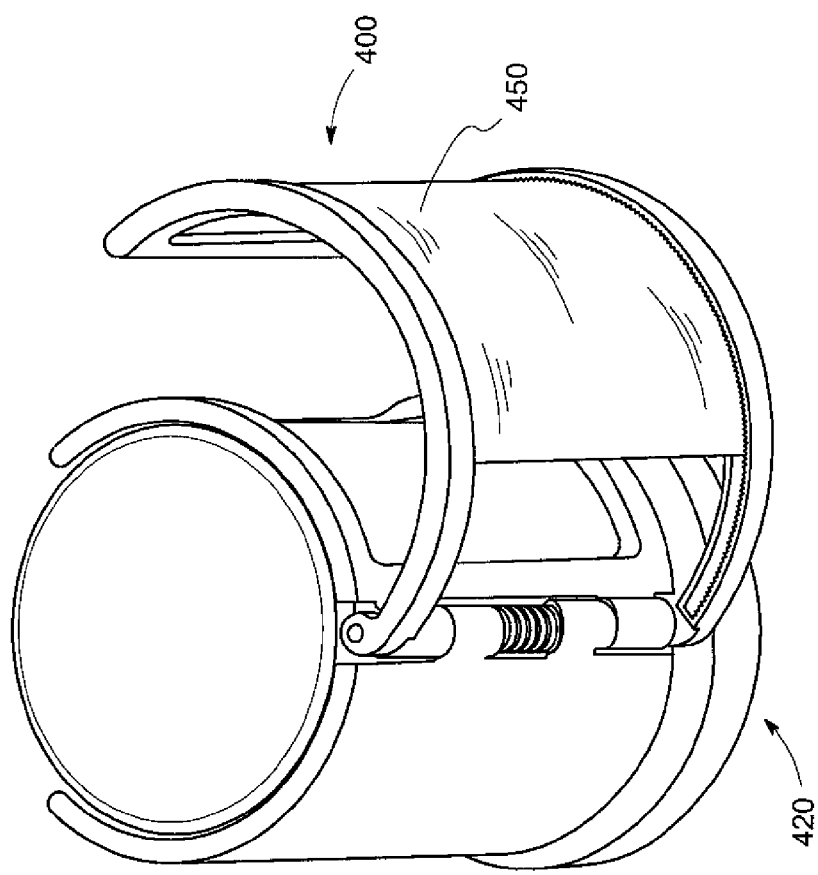
FIG. 7 is a perspective view of a magnifying assembly of yet another alternative embodiment of the present invention.

Reference is now made to FIG. 7 which shows yet another alternative embodiment of a magnifying assembly, generally indicated at 400, constructed in accordance with the present invention for use in enlarging information disposed on container 100. Here too, magnifying assembly 400 comprises a container holder assembly, generally indicated at 420, for preferably releasably holding container 100, and a magnifying lens 450 coupled to container holder assembly 420. Similarly therefore, magnifying lens 450 is movable towards and away from container 100 while container holder assembly 420 holds container 100. Container holding assembly 420 may be constructed similarly to container holding assembly 20. The significant distinction between this embodiment of assembly 400 and assembly 10 is that the magnifying lens 450 is a fresnel lens. In all other material respects, assembly 400 is similar to assembly 10.

Figure 8:
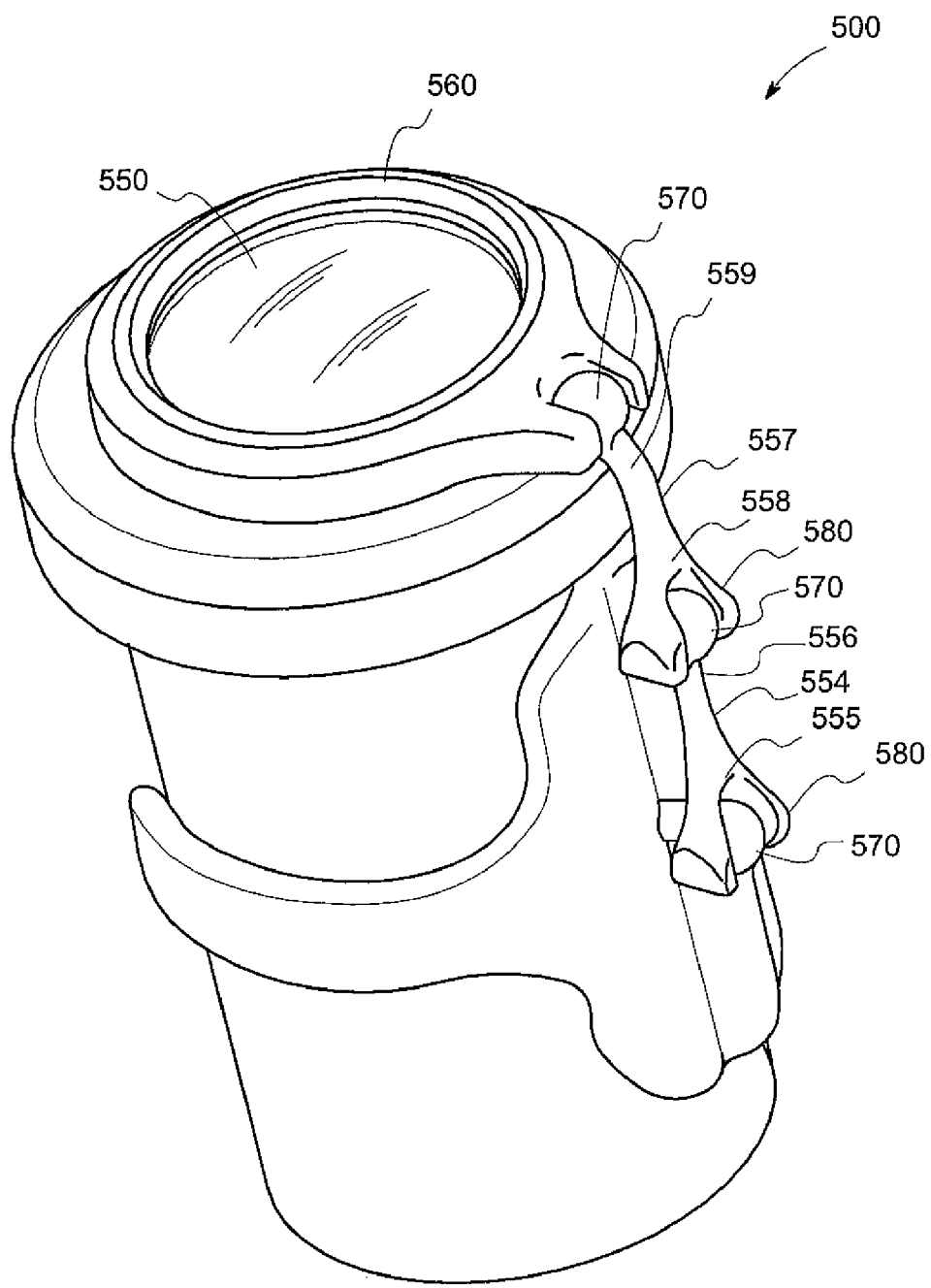
FIGS. 8 and 8A are perspective views of a magnifying assembly constructed in accordance with still another alternative embodiment of the present invention.
Figure 8A:
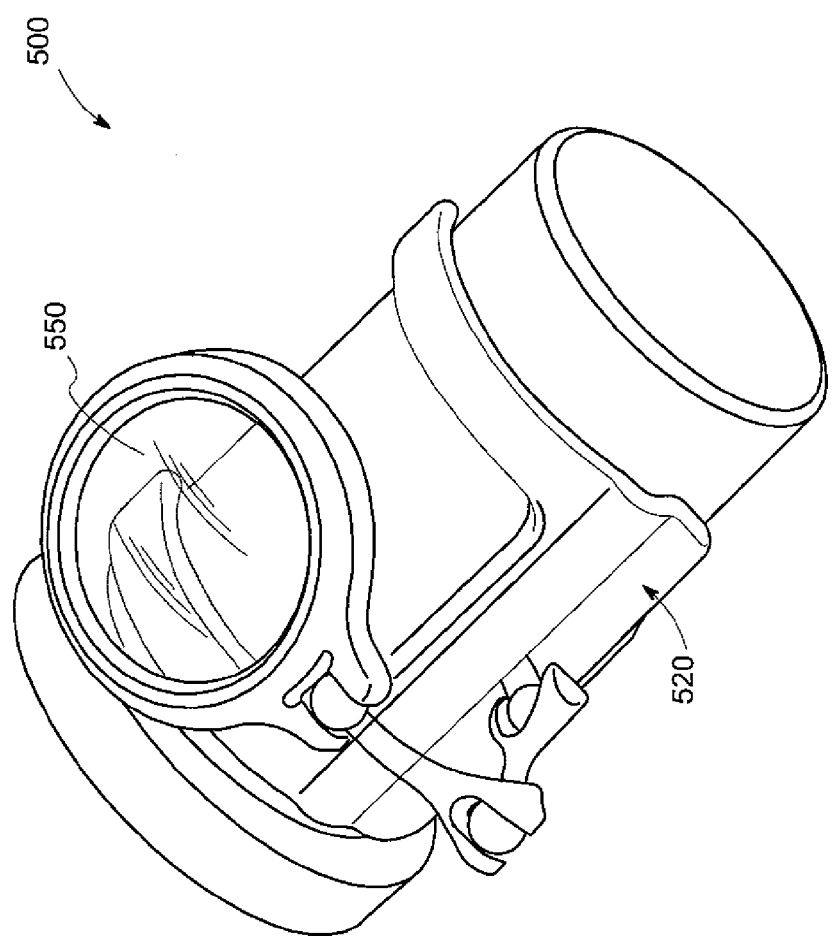
Figure 9B:
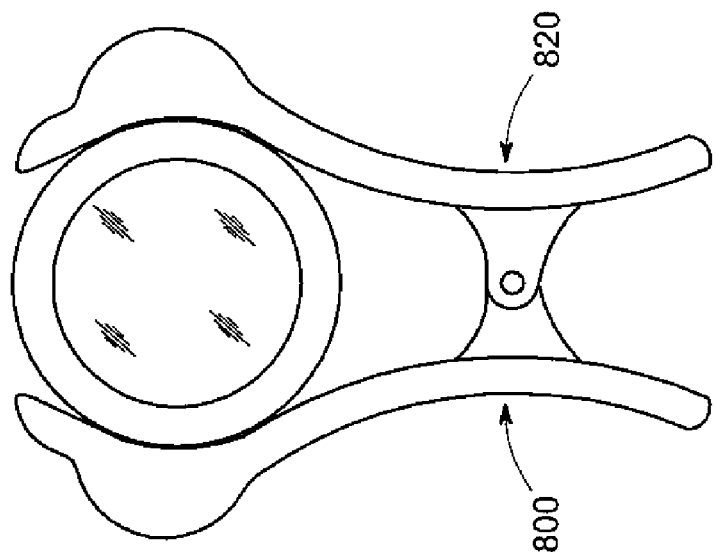
FIGS. 9A, 9B, 9C and 9D are perspective views of a magnifying assembly constructed in accordance with still another embodiment of the present invention.
Figure 9A:
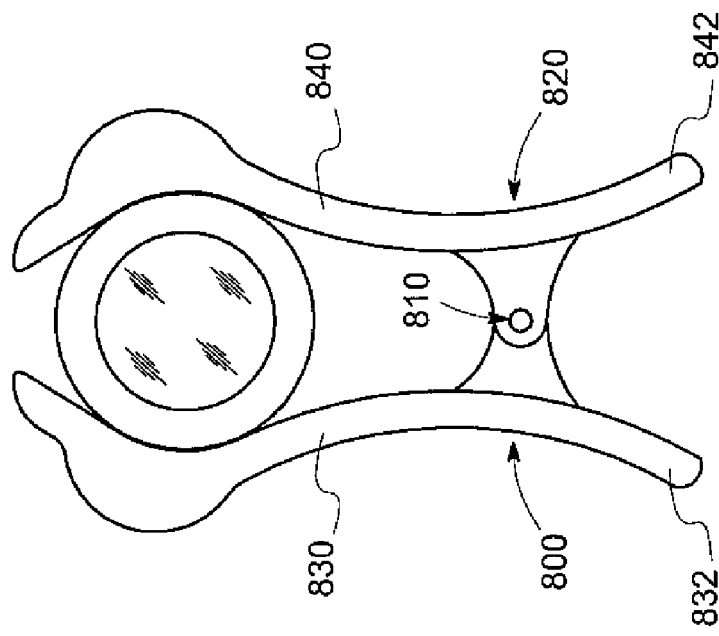
Figure 9D:
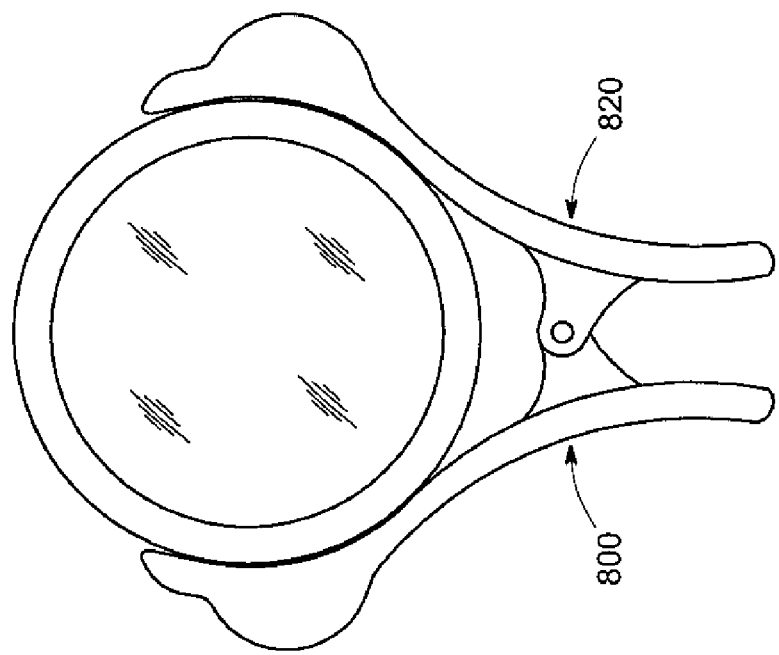
Figure 9C:
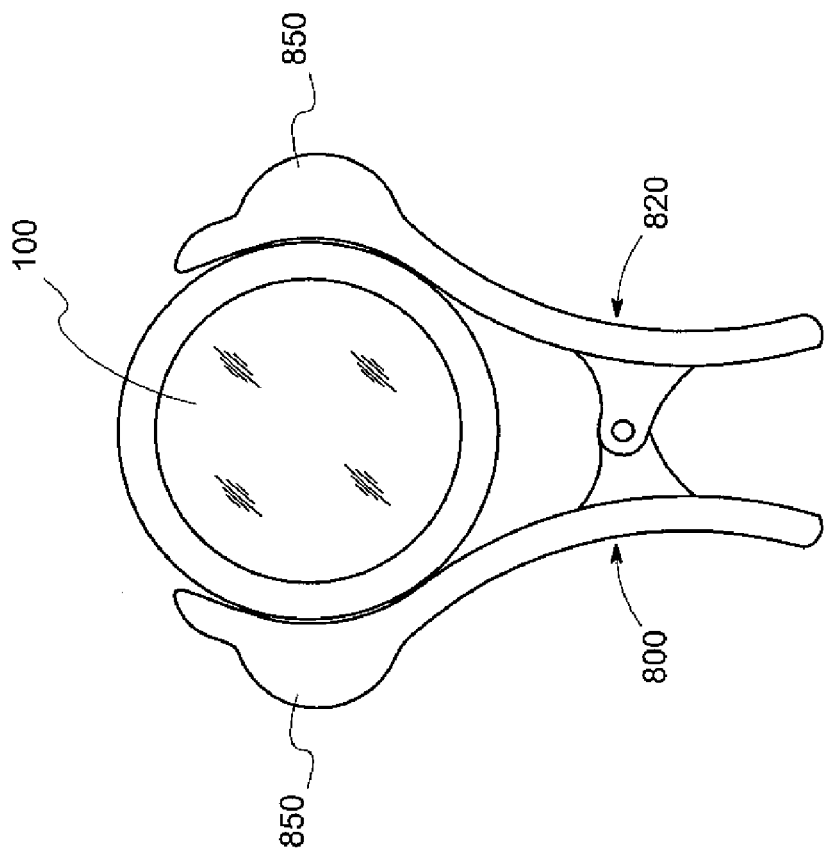
Figure 10B:
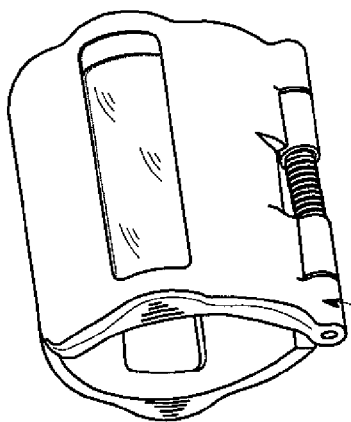
FIGS. 10A, 10B, 10C show yet another alternative of the present invention.
Figure 10C:
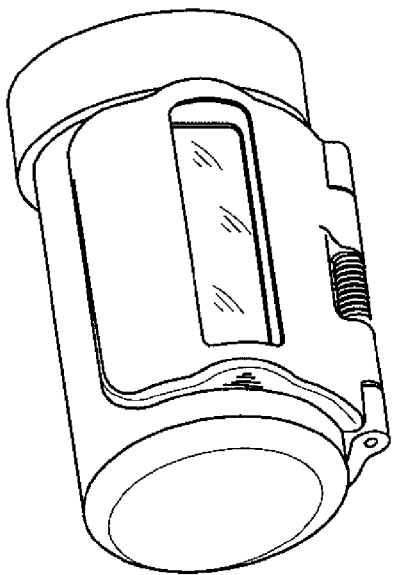
Figure 10A:
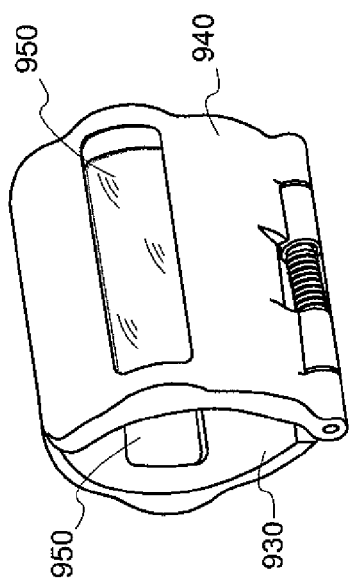

Reference is now made to FIGS. 8 and 8A which show yet still another alternative embodiment of a magnifying assembly, generally indicated at 500, constructed in accordance with the present invention for use in enlarging information disposed on container 100.

Magnifying assembly 500 comprises a container holder assembly, generally indicated at 520, for preferably releasably holding container 100, and a magnifying lens 550 coupled to container holder assembly 520. In accordance with a preferred embodiment, magnifying lens 550 is likewise movable towards and away from container 100 while container holder assembly 520 holds container 100. In this way, information disposed on container 100 (e.g. on label 110 or on the container itself, for example) appears enlarged when viewed through magnifying lens 550.

The container holding assembly 520 may be constructed similarly to container holding assembly 20. Alternatively, assembly 520 may be formed of a resilient flexible material having a preformed inwardly curving characteristic. This material will put sufficient pressure upon the container to hold it securely and yet allow the container to be removed easily and hold its shape once the container is removed. Thus, the significant difference between this embodiment and that disclosed above is in the manner in which the magnifying lens 550 is coupled to container holding assembly 520. In this embodiment, magnifying assembly 500 comprises at least a first magnifying lens support arm 554 having a first end 555 pivotable relative to container holder assembly 520 and a second end 556 coupled to magnifying lens 550. In the preferred construction of this alternative embodiment, assembly 500 comprises a magnifying lens support assembly 560 for supporting the magnifying lens 550. Moreover, in the preferred construction, the magnifying lens support assembly comprises at least a second magnifying lens support arm, such as arm 557 having a first end 558 and a second end 559. In this embodiment, the respective ends of the arms have either a ball joint (e.g. ball joint 570) or a socket 580. In this way, first magnifying lens support arm 554 has a first end pivotable relative to the container holder assembly, additional magnifying support arm 557 has a first end pivotably coupled to the second end 556 of magnifying lens support arm 554 and a second end 559 pivotably coupled to the magnifying lens (or more specifically, support 560), whereby the pivoting of the first and at least one additional magnifying lens support arms relative to the container holding assembly and the first magnifying lens support art, respectively, moves the magnifying lens towards and away from the container.

Reference is now made to FIGS. 9A-9D for yet another alternative embodiment of the present invention, shown generally 800, constructed in accordance with the present invention for use in enlarging information disposed on container 100.

Magnifying assembly 800 comprises a container holder assembly, generally indicated at 820, for preferably releasably holding container 100. Container holding assembly 820 may be constructed with an assembly pin, screw, rivet, and/or pivot type arrangement (i.e. collectively the coupling arrangement 810) for coupling a first container holder arm 830 to a second container holder arm 840. In this way, first container holding arm 830 and second container holding arm 840 are spaced apart from each other and moveable towards and away from each other, such as by a spring biasing thereof.

Ends 832, 842 of the container holding arms may be pinched or otherwise brought towards each other to insert container 100 therebetween. In this embodiment, a magnifying lens 850 may be coupled to one or both container holding arms 830, 840. In this way, a container is releasably holdable between the first and second container holding arms and information disposed on the container appears enlarged when viewed through the magnifying lens.

Lastly, reference is made to FIGS. 10A-10D, which shows magnifying assembly 900 constructed in accordance with yet another embodiment and somewhat similar to assembly 800. Here, first and second container holding arms 930, 940 are pivotable relative to each other about a coupler 910, preferably a spring and pin arrangement as in assembly 20 of the first embodiment. A magnifying lens 950 may be coupled to one or both container holding arms. In this way, a container is releasably holdable between the first and second container holding arms and information disposed on the container appears enlarged when viewed through the magnifying lens. Also, as shown in this embodiment and is true for all the embodiments, the advantageous construction of the holding assembly provides for the accommodation of a wide variety of shapes and sizes of the container.

It can thus be seen that the present invention is advantageous for use in connection with containers of the type typically used for prescription medication. However and as also mentioned above, the present invention is not so limiting, and can be utilized in connection with any type of container having information printed or otherwise disposed thereon which is difficult to read, such as, but not limited to, those types of containers disclosed herein. Although believed to be self-evident, it should be appreciated that in the most typical of examples, the printed information may be provided directly upon a sidewall of container 10, such as through the use of a conventional label or other "printing" operations such as decals, painting, silk screening or photographic processes. The important aspect with respect to the present invention is not the manner in which the information is provided on container 100 but rather the characteristic use of relatively small print size which makes the use of the present invention magnifier advantageous.

Accordingly, it can be seen that the present invention is an improved magnifier for container labels, such as those used on prescription medication containers. In particular, the present invention provides an improved magnifier for container labels for other items, such as, but not limited to, cosmetics, nonprescription vitamins other containers that may use relatively fine print on their labels. Furthermore, the present invention provides is an improved magnifier that is relatively inexpensive to manufacture and that can be easy to use by persons having limited eyesight and/or vision, as well as by persons that would otherwise not want or find it less than convenient to use a conventional magnifying lens (e.g. with a handle). Moreover, the present invention provides a magnifying assembly that can be used with containers of various sizes (e.g. large and small in diameter) and shapes (e.g. rectangular).

Additionally, as disclosed, the present invention can be manufactured relatively inexpensively and easily from, for example, plastic materials. For example, while the preferred embodiments are disclosed herein, it should be understood that in place of a holding assembly such as that provided by holding assembly 20 (or similar embodiments herein), one skilled in the art would appreciate that the various container holding assemblies disclosed herein may be formed of or incorporate a resilient flexible material (such as plastic) having a preformed inwardly curving characteristic, so as to provide sufficient pressure upon the container to hold it securely and yet allow the container to be removed easily and hold its shape once the container is removed.

Figure 1:
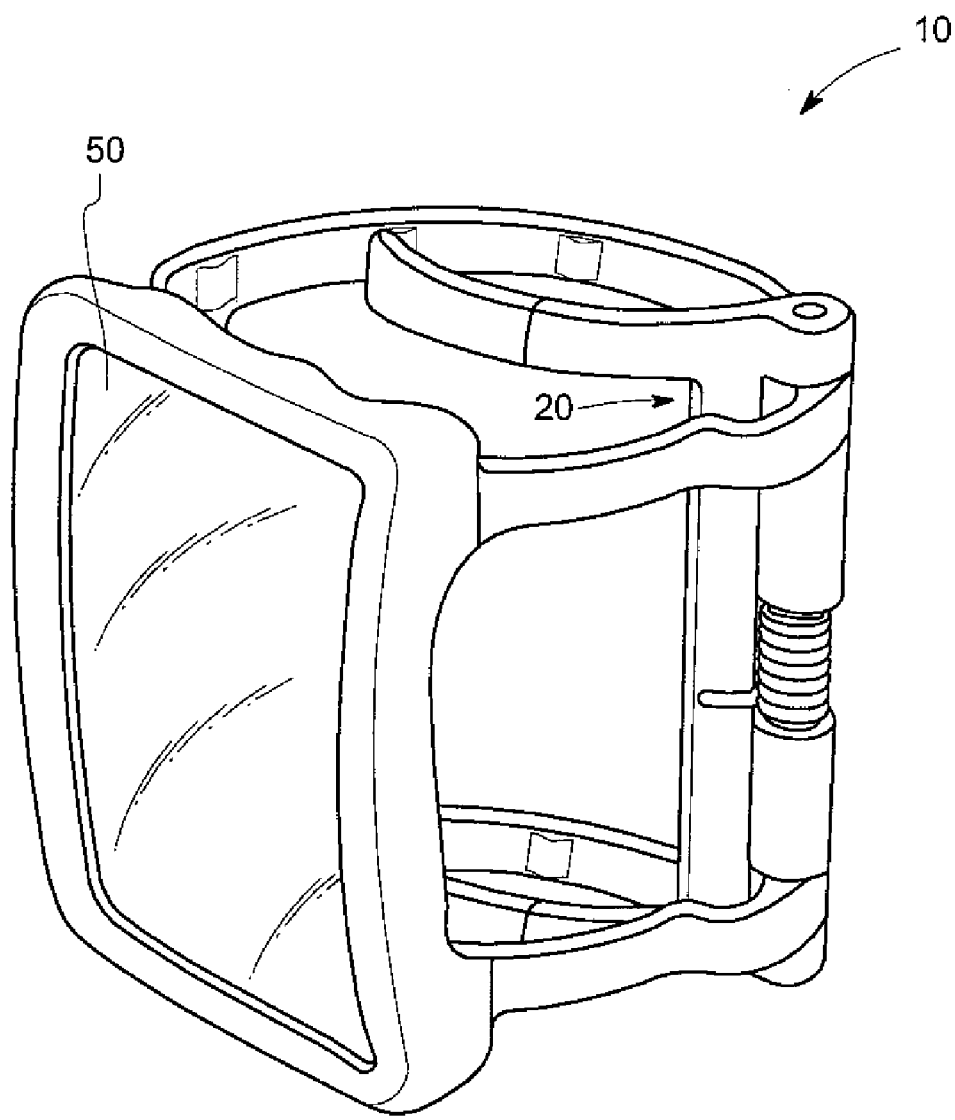
FIG. 1 is a perspective view of a magnifying assembly constructed in accordance with the present invention.
Figure 2:
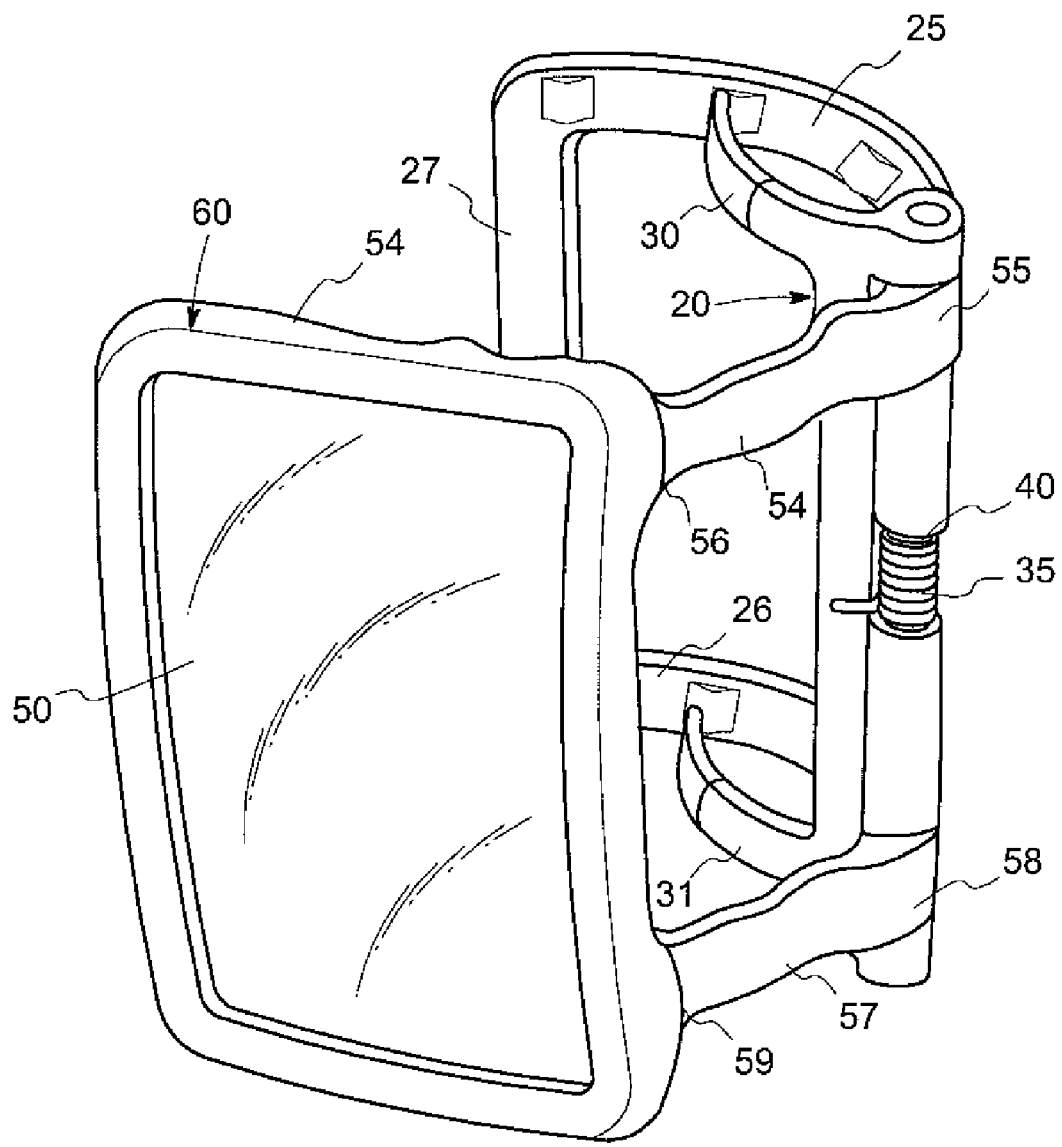
FIG. 2 is a perspective view of the magnifying assembly of FIG. 1, illustrated in an expanded position.
Figure 3:
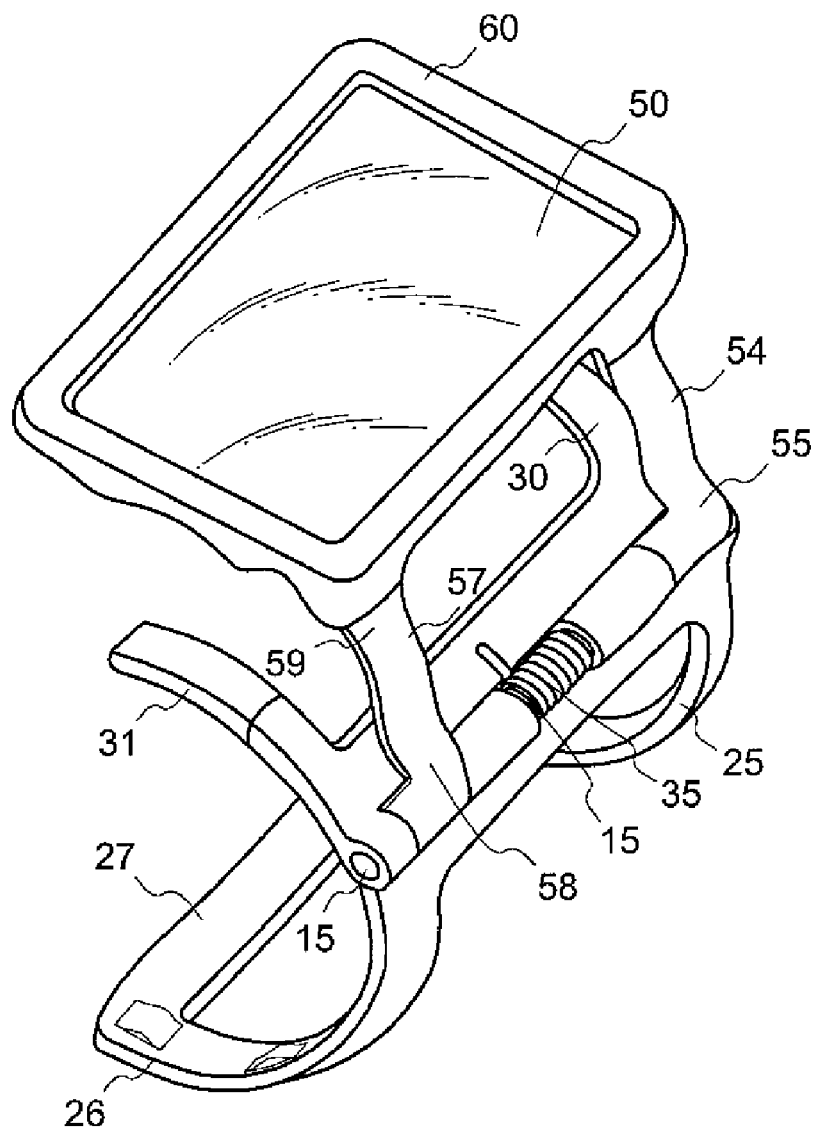
FIG. 3 is another perspective view of the magnifying assembly of FIG. 1.

In addition, the use of a moveable (e.g. rotateable relative to the container holder assembly) magnifying lens allows for easy storage in a medicine chest, cabinet or the like because the magnifying lens 50 can be rotated close to container 100 during storage or non-use. Similarly, as illustrated in FIG. 1, without a container being supported, the biasing nature of arms 25, 30, 26, 31 along with the rotateable feature of frame 60 permits even further collapsing of magnifying assembly 10 during storage or non-use. Also, a second spring to spring bias frame 60 to container holder assembly can be used if further collapsibility is desired.

Lastly, in the preferred embodiment, the lens is a double convex lens, and one that is 1.5×–3.5× magnification.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It should also be understood that the following claims are intended to cover all of the generic and specific features of the invention described herein and all statements of the scope of the invention that as a matter of language might fall therebetween.

What is claimed is:

1. A magnifying assembly for enlarging information disposed on an elongated container wherein the container comprises a top at which items may be placed into the container, the magnifying assembly comprising:
   a container holder assembly for holding the container about an outer side surface, wherein the container holder assembly comprises a first container holding arm and a second container holding arm spaced apart from the first container holding arm, wherein both the first and second container holding arms are coupled to an assembly pin and wherein the second container holding arm is rotatable about the assembly pin relative to the first container holding arm such that the second container holding arm is moveable towards and away from the first container holding arm;
   a magnifying lens coupled to the container holder assembly, wherein the magnifying lens faces the outer side surface of the container when the container is held by the container holder assembly about the outer side surface of the container and movable towards and away from the outer side surface of the container while the container remains held by the container holder assembly;
   at least one magnifying lens support arm having a first end rotatable about the assembly pin and a second end coupled to the magnifying lens, wherein the rotation of the at least one magnifying lens support arm about the assembly pin moves the magnifying lens towards and away from the outer side surface of the container;
   wherein the magnifying lens faces the outer side surface of the container as the lens moves towards and away from the outer side surface of the container;
   whereby information disposed on the container appears enlarged when viewed through the magnifying lens.

2. The magnifying assembly as claimed in claim 1, wherein the at least one magnifying lens support arm, at its second end, has the shape of a frame, wherein the magnifying lens is coupled to the frame.

3. The magnifying assembly as claimed in claim 1, wherein the second container holding arm is biased towards the first container holding arm.

4. The magnifying assembly as claimed in claim 3, wherein the second container holding arm is spring biased towards the first container holding arm.

5. The magnifying assembly as claimed in claim 1, comprising at least a second magnifying lens support arm having a first end rotateable relative to the container holder assembly and a second end for supporting the magnifying lens;
   whereby the rotation of the second magnifying lens support arm moves the magnifying lens towards and away from the container.

6. The magnifying assembly as claimed in claim 5, wherein the second ends of the magnifying lens support arms form the shape of a frame, wherein the magnifying lens is coupled to the frame.

7. The magnifying assembly as claimed in claim 1, comprising at least a second magnifying lens support arm having a first end rotateable relative to the container holder assembly and a second end for supporting the magnifying lens whereby the rotation of the second magnifying lens support arm moves the magnifying lens towards and away from the container; and
   wherein the second ends of the magnifying tens support arms form the shape of a frame, wherein the magnifying lens is coupled to the frame.

8. The magnifying assembly as claimed in claim 7, wherein the magnifying lens support arms are rotateable about the assembly pin;
   wherein the second container support arm is positioned intermediate the frame and the first container support arm such that rotation of the frame towards and away from the container does not interfere with the holding of the container between the first and second container holding arms.

9. The magnifying assembly as claimed in claim 7, wherein the magnifying lens support arms are rotateable about the assembly pin;
   wherein the second container support arm is positioned intermediate the frame and the first container support arm and the frame is rotateable towards and away from the container while the container remains held between the first and second container holding arms by a biasing of the second container holding arm towards the first container holding arm.

10. The magnifying assembly as claimed in claim 1, wherein the at least one magnifying lens support arm, the first container holding arm and the second container holding arm are all formed of plastic.

11. The magnifying assembly as claimed in claim 1, wherein the container holder assembly comprises a third container holding arm and a fourth container holding arm spaced apart from each other, wherein both the third and fourth container holding arms are coupled to the assembly pin; and
   wherein the third container holding arm is rotateable about the pin relative to the fourth container holding arm such that the third container holding arm is moveable towards and away from the fourth container holding arm;
   whereby a container is holdable between the first, second, third and fourth container holding arms.

12. The magnifying assembly as claimed in claim 11, wherein the third container holding arm is connected to the fourth container holding arm at their respective second ends.

13. The magnifying assembly as claimed in claim 11, wherein the third container holding arm is spring biased towards the fourth container holding arm.

14. The magnifying assembly as claimed in claim 1, comprising a magnifying lens support assembly coupled to the container holding assembly and the magnifying lens, wherein the magnifying support assembly comprises the first magnifying lens support arm and at least one additional magnifying lens support arm,
   wherein the first magnifying lens support arm and the at least one additional magnifying support arm are slidably coupled to the container holder assembly;
   whereby the sliding of the first and at least one additional magnifying lens support arms relative to the container holding assembly moves the magnifying lens towards and away from the container.

15. The magnifying assembly as claimed in claim 14, wherein the magnifying lens support assembly comprises four magnifying lens support arms each of which have a first end slidably coupled to the container support assembly and a second end coupled to a magnifying lens support;
   wherein the magnifying lens is supported by the magnifying lens support; and
   wherein each of the respective second ends of the magnifying lens support arms are slidably coupled to the magnifying lens support;
   whereby the sliding of the first and second ends of each magnifying lens support arms relative to the container holding assembly and the magnifying lens support, respectively, moves the magnifying lens towards and away from the container.

16. The magnifying assembly as claimed in claim 1, comprising at least a first magnifying lens support arm having a first end movable relative to the container holder assembly and a second end coupled to the magnifying lens;
   whereby the moving of the at least one magnifying lens support arm moves the magnifying lens towards and away from the container.

17. The magnifying assembly as claimed in claim 16, comprising a magnifying lens support assembly coupled to the container holding assembly and the magnifying lens, wherein the magnifying support assembly comprises the first magnifying lens support arm and at least one additional magnifying lens support arm,
   wherein the first magnifying lens support arm and the at least one additional magnifying support arm are rotatably coupled to the container bolder assembly;
   whereby the rotation of the first and at least one additional magnifying lens support arms relative to the container holding assembly moves the magnifying lens towards and away from the container.

18. The magnifying assembly as claimed in claim 17, wherein the magnifying lens support assembly comprises at least four magnifying lens support arms each of which have a first end rotateably coupled to the container support assembly and a second end coupled to the magnifying lens;
   whereby the rotation of the respective first ends of each magnifying lens support arm relative to the container holding assembly moves the magnifying lens towards and away from the container.

19. The magnifying assembly as claimed in claim 18, wherein the magnifying lens support assembly comprises eight magnifying lens support arms such that:
   a first of which hasa first end rotateably coupled to the container support assembly
   a second of which has a first end rotateably coupled to the container support assembly;
   a third of which has a first end rotateably coupled to the container support assembly;
   a fourth of which has a first end rotateably coupled to the container support assembly;
   a fifth of which has a first end rotateably coupled to a second end of the first magnifying lens support arm and a second end rotateably coupled to the magnifying lens;
   a sixth of which has a first end rotateably coupled to a second end of the second magnifying lens support arm and a second end rotateably coupled to the magnifying lens;
   a seventh of which has a first end rotateably coupled to a second end of the third magnifying lens support arm and a second end rotateably coupled to the magnifying lens; and
   an eighth of which has a first end rotateably coupled to a second end of the fourth magnifying lens support arm and a second end rotateably coupled to the magnifying lens;
   whereby the rotation of the magnifying lens support arm relative to the container holding assembly and/or the magnifying lens moves the magnifying lens towards and away from the container.

20. The magnifying assembly as claimed in claim 19, comprising a magnifying lens support for supporting the magnifying lens, and wherein the second ends of each magnifying support arm are coupled to the magnifying lens support.

21. The magnifying assembly as claimed in claim 1, comprising at least a first magnifying lens support arm having a first end pivotable relative to the container holder assembly and a second end coupled to the magnifying lens;
   whereby the pivoting of the at least first magnifying lens support arm moves the magnifying lens towards and away from the container.

22. The magnifying assembly as claimed in claim 21, comprising a magnifying lens support assembly coupled to the container holding assembly and the magnifying lens, wherein the magnifying support assembly comprises the first magnifying lens support arm and at least one additional magnifying lens support arm,
   wherein the at least one additional magnifying support arm has a first end pivotably coupled to the first magnifying lens support arm and a second end pivotably coupled to the magnifying lens;
   whereby the pivoting of the first and at least one additional magnifying lens support arms relative to the container holding assembly and the first magnifying lens support art, respectively, moves the magnifying lens towards and away from the container.

23. The magnifying assembly as claimed in claim 22, comprising a magnifying lens support for supporting the magnifying lens, and wherein the second end of the at least one additional magnifying support arm is pivotably coupled to the magnifying lens support.

24. The magnifying assembly as claimed in claim 23, comprising ball and socket joints for providing the pivoting of the respective ends of the magnifying lens support arms.

25. The magnifying assembly as claimed in claim 1, wherein the first and second container holding arms are pivotable relative to each other.

26. The magnifying assembly as claimed in claim 1, wherein the first and second container holding arms are pivotable relative to each other about a coupler.

* * * * *